United States Patent [19]

Anderson

[11] 4,305,193

[45] Dec. 15, 1981

[54] ZONE CONTROL VALVE REMOVAL TOOL AND METHOD

[76] Inventor: Steven C. Anderson, 3124 Park Ave. South, Minneapolis, Minn. 55407

[21] Appl. No.: 111,374

[22] Filed: Jan. 11, 1980

[51] Int. Cl.³ .................................... B23P 19/04

[52] U.S. Cl. .................................... 29/213 R; 29/263

[58] Field of Search .................. 29/213, 263; 137/315, 137/327, 268, 15

[56] References Cited

U.S. PATENT DOCUMENTS

| | | | |
|---|---|---|---|
| 3,561,090 | 2/1971 | Fritch | 29/213 |
| 3,579,796 | 5/1971 | Fillion | 29/263 |
| 3,840,967 | 10/1974 | Olson | 29/213 |
| 4,059,883 | 11/1977 | Osborne | 29/263 |

FOREIGN PATENT DOCUMENTS

| | | | |
|---|---|---|---|
| 2290628 | 5/1974 | France | 137/315 |

*Primary Examiner*—James L. Jones, Jr.

*Attorney, Agent, or Firm*—Williamson, Bains, Moore & Hansen

[57] ABSTRACT

A tool and method are disclosed for removing a valve core or element from a valve which is under pressure without requiring that the system be shut down and the pressure relieved. A tool having a passage therethrough sized to accommodate the valve element to be serviced is bolted over the valve and the valve element is drawn therein and the tool closed to isolate the passage and the element from the pressurized system thereby allowing the element to be repaired or replaced.

4 Claims, 6 Drawing Figures

ZONE CONTROL VALVE REMOVAL TOOL AND METHOD

BACKGROUND OF THE INVENTION

Apartments and other large buildings are often provided with so-called zone heating and cooling systems wherein a building system is provided with pressurized hot water or coolant. Individual rooms or zones are thermostatically controlled and individual valves responsive to the thermostat are placed in the lines leading to the rooms or zones to allow control of the fluid to the radiators in each area. Inevitably, as with all mechanical devices, these zone control valves require servicing, that is replacement or repair of these seals therein. Heretofore this has required generally shutting down the whole system in order to repair or replace one valve. This can be quite inefficient and also leaves the whole building without heating or cooling while one area is being serviced.

U.S. Pat. Nos. 3,275,023, 4,127,141, and 2,746,470 all deal with the problems of servicing pressurized valves. However, none of these prior art patents are suitable for the type of servicing described above.

It is, therefore, an object to this invention to provide a device which will permit the servicing of a valve under pressure. It is also an object to this invention to provide such an apparatus and method as to permit the servicing to be accomplished quickly and efficiently and which requires a minimum of space due to the confined nature of the areas in which such valves are often located.

SUMMARY OF THE INVENTION

In the instant invention, the motor for the zone control is removed and the tool valve is fastened in its place on top of the zone control valve. A puller mechanism is then inserted into the tool valve, the puller mechanism having a number of tangs which snappingly engage into a groove found in the top of the zone control valve plug stem. A collar is then placed over a portion of the pulling mechanism so that only the handle of the pulling mechanism extends out of the tool valve. The handle has been drawn upwardly pulling the puller and the valve plug into the core of the tool valve. The core of the tool valve then is rotated to a position isolating it from the heating system. At that point the collar may be removed and the plug removed for repair and/or replacement; reassembly takes place in the reverse of the above description.

These and other objects of my invention will become readily apparent as the following description is read in conjunction with the accompanying drawings wherein like reference numerals are used to refer to the several views.

DESCRIPTION OF THE DRAWING FIGURES

DESCRIPTION OF THE PREFERRED EMBODIMENT

Figure 1:
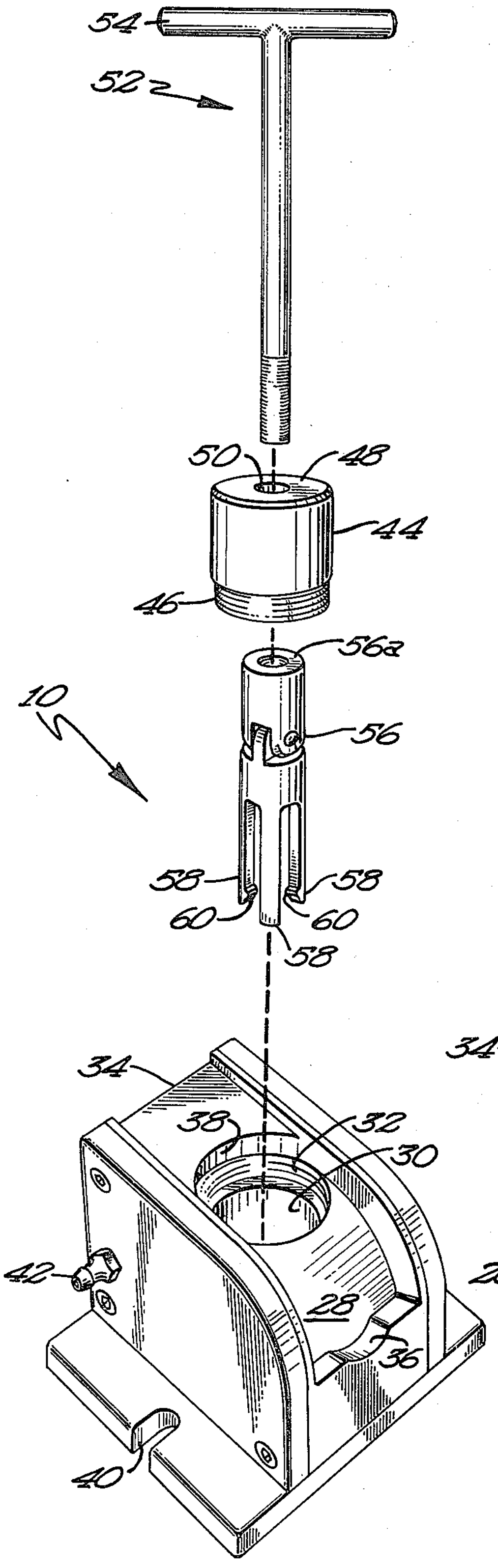
FIG. 1 is an exploded perspective view of the invention.

Turning now to the drawings, FIG. 1 shows generally a valve pulling device 10 and an exploded view. Device 10 is designed to be attached to a zone control valve 12 (or any other similar type of valve which is normally under pressure). Valve 12 has, generally, a pair of ears 14 with holes therein upon which a thermostatically controlled electric motor is normally mounted. For servicing the valve, this motor is removed. Valve 12 has a through passage 16 which may be closed by rotation of valve plug 20 which is located in a cylindrical bore 18. A seal 22 is used to prevent leakage, and it is this seal which generally requires replacing after a period of time and service. A stem 24 is located on top of core 20, stem 24 typically having a groove 26 located about its circumference. It should be emphasized that the parts described above are all present in a vast majority of zone control valves being used today. Thus the instant invention is suited for servicing most of those valves.

Figure 2:
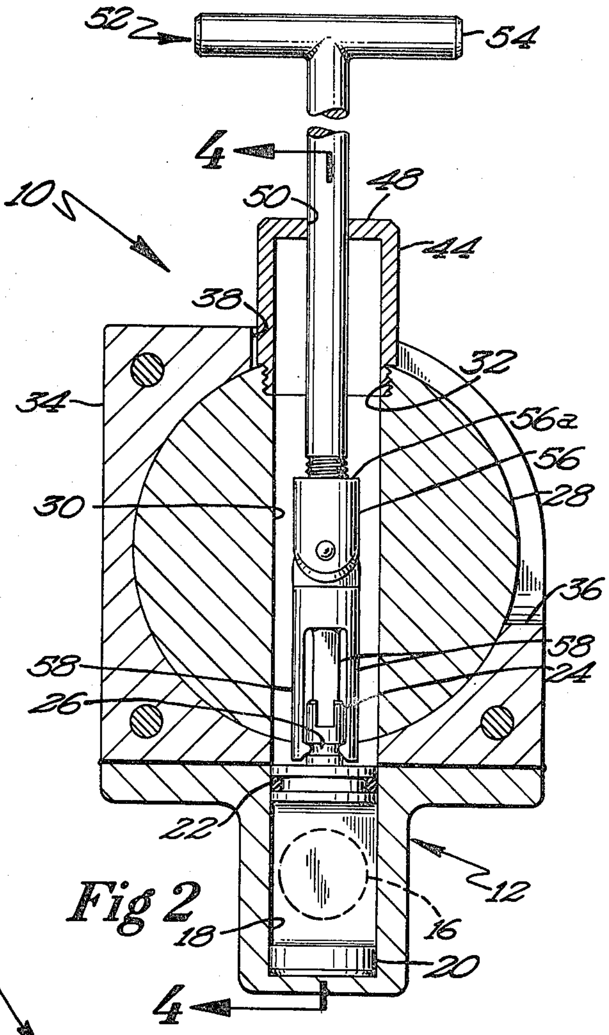
FIG. 2 is a vertical sectional view showing the initial stages of valve removal.
Figure 3:
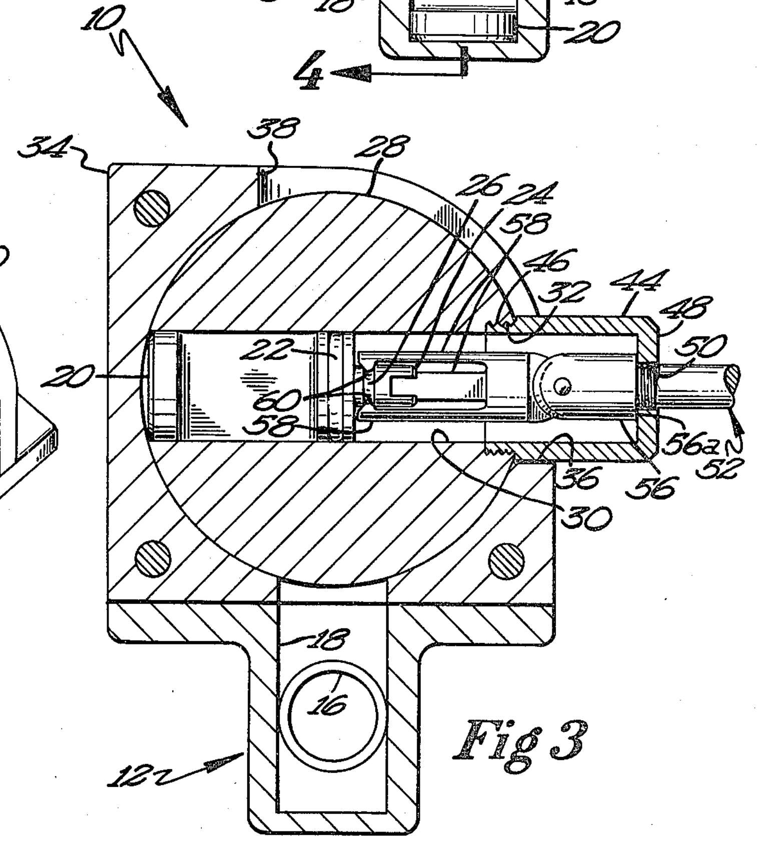
FIG. 3 is a sectional view taken along the same section as FIG. 2 and showing the tool valve in the isolation position.
Figure 4:
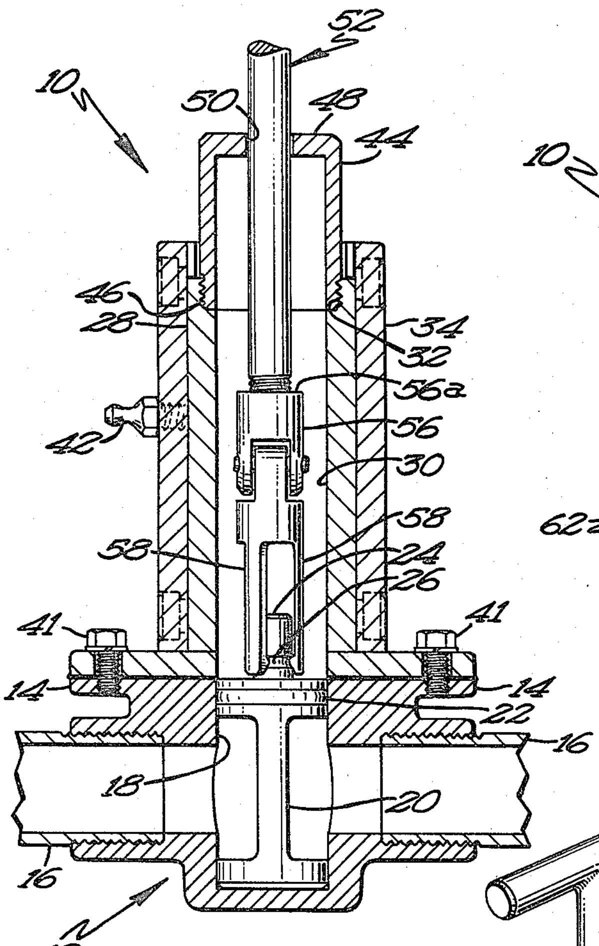
FIG. 4 is a sectional view taken along lines 4—4 of FIG. 2.

The tool 10 is comprised of a tool valve body 34 having a rotatable tool valve core 28 located therein, tool valve core 28 having a cylindrical bore 30 therethrough. Bore 30 is sized to accommodate the outer diameter of zone control valve plug 20. The upper end of bore 30 is provided with threads 32 which meetingly engage with collar 44 which has a corresponding inner diameter and upper lip 48 which has a bore 50 therein sized to accommodate handle 54 as described more fully hereinafter. Housing 34 has stops 36 and 38 located therein to control and limit rotation of tool valve core 28 therein; these stops limiting travel to the position shown in FIGS. 2 and 3. Slots 40 are provided in tool valve body 34 for attachment via bolts 41 to ears 14 of zone control valve 12.

A grease fitting 42 is provided in the side of housing 34 to enable grease to be injected and provide a sealing and lubricating capability between tool valve core 28 and body 34. As noted previously, collar 44 has threads 46 at the lower end thereof for threading engagement with threads 32 of plug 28.

A pulling device, generally 52, is comprised of a handle 54 designed for threading engagement with the upper end 56a of U-joint 56. Attached to the lower end of U-joint 56 are a plurality of fingers 58 having tangs 60 on the inner side thereof designed for snap fitting engagement with groove 26 of stem 24.

A retaining flange 62, the use of which is described hereinafter, is formed of a U-shaped piece having an upper plate 64 and a lower plate 66. A slot 68 located in upper plate 64 is sized to correspond approximately to the diameter of stem 24 of core 20. The lower slot 70 located in lower plate 66 is sized to fit beneath ears 14 and retain flange 62 to valve 12.

OPERATION OF THE INVENTION

In order to repair a zone control valve 12 such as that shown, a thermostatically controlled motor (not shown) is removed and tool valve body 34 bolted thereon with bolts 41 passing through slots 40 into ears 14 of zone control valve 12. It is desirable to have some sort of method of sealing the tool valve body 34 to the zone control valve 12, and towards this end any number of conventional means may be used. An O-ring may be located in the bottom surface of tool valve body 34 or alternatively, duct putty may be placed on the bottom of body 34 to effect a seal. The use of the duct putty may often be desirable in conjunction with the O-ring where the zone control valve 12 has an irregular or marred surface which will not seal properly with the O-ring.

The puller mechanism is then assembled by inserting puller 56 into bore 30 and thereafter threading collar 44 into threads 32 of core 28. Handle 54 is then threaded into the top end **56*a* of puller 56. Handle 54 is then pressed downwardly until fingers 58 spread slightly outwardly about stem 24 whereupon tangs 60 snap into groove 26. The person repairing then pulls upwardly on handle 54 until the upper edge 56*a* of puller 56 abuts the bottom surface of lip 47 of collar 44. The valve core 28 of the tool is then rotated to the position shown in FIG. 3 thereby isolating the pressurized system from the valve core 20** to be repaired.

Collar 44 is then unscrewed from core 28 and the puller 56 and core 20 withdrawn and the core 20 unsnapped to be either replaced or repaired as so desired.

To replace valve core 20, the process is reversed from that described above. For reinsertion, while the puller mechanism 56 may be utilized, it may be desirable to utilize a separate insertion tool (not shown). The insertion tool may be a tubular member having an outside diameter like that of puller 56 and having a smooth inner bore sized to slide over stem 24 and bear upon the top surface of plug 20. The use of such an insertion tool facilitates insertion as there is no need to utilize the tangs 60 since there is no need to hook and unhook the same. All the insertion tool need do is provide a means for pushing down on the plug 20.

Figure 6:
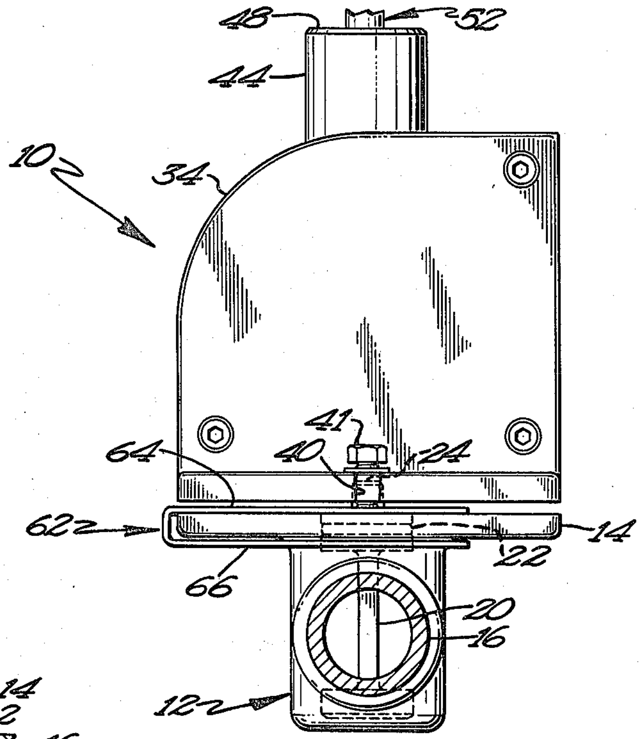
FIG. 6 is an exterior view showing the retaining clip.
Figure 5:
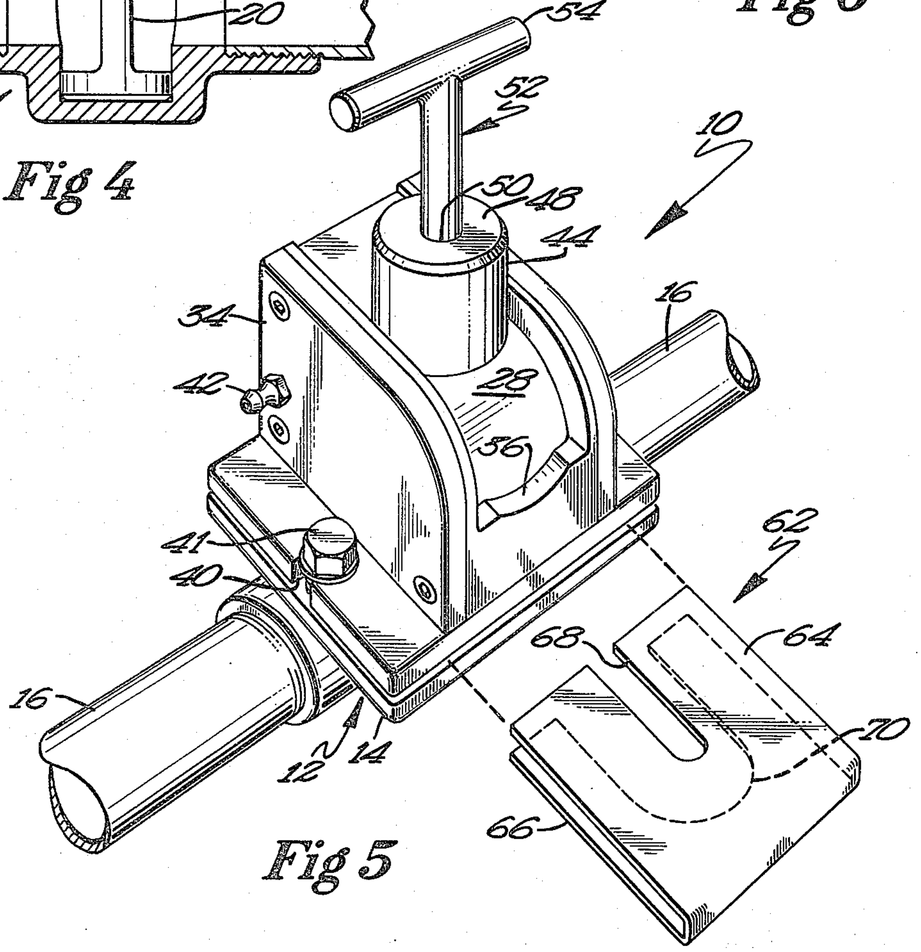
FIG. 5 is a perspective view showing the tool in conjunction with the retaining clip for reinstallation.

It is desirable to reinsert valve core 20 in the position shown in FIG. 6, that is, so that zone control valve 12 is open. Such replacement will place the least pressure on core 20 which would tend to cause it to pop out. Once core 20 has been repaired and reinserted, it can have a tendency to be blown out of valve 12 by the pressure. This tendency is less pronounced during removal because the damaged seal tends to resist. This can be prevented by slightly loosening bolts 41 as shown in FIGS. 5 and 6 and inserting retainer flange 62 between the tool valve body 34 and around ears 14 of the zone control valve. After retainer plate 62 is inserted, the body 34 may be completely unbolted and the motor reattached and, once it has been substantially bolted down, retainer plate 62 may also be removed.

It is contemplated that various changes and modifications may be made to the zone control valve removal tool without departing from the spirit or scope of my invention as defined by the following claims.

What is claimed is:

1. An apparatus for repairing valves under pressure having plugs, said apparatus comprising:

a tool valve, said tool valve having a passage therethrough sized to accept a valve plug from a valve to be repaired, said tool valve being movable between a first position and a second position, wherein when in said first position, said passage communicates with said pressurized valve and said second position isolating said passage from said pressurized valve;

means for pulling said plug into said passage, said pulling means comprising a puller body and a handle for manual engagement extending from said body; and means for limiting the travel of said body, said limiting means comprising a collar having a cylindrical portion and an inwardly directed annular lip at one end thereof, said cylindrical portion having an inner diameter corresponding to said passage and the inner diameter of said lip corresponding to said handle and wherein said tool valve is a ball valve having a body and a ball, said collar threadingly engageable in said tool ball.

2. The apparatus for repairing valves of claim 1 wherein said valve plug has a circumferential groove and said pulling means has means to engage said groove.

3. The apparatus for repairing valves of claim 2 wherein said engaging means comprises a plurality of circumferencially spaced fingers, each of said fingers having a tang sized to fit said groove, each said tang being located on the inner side of the corresponding finger.

4. An apparatus for repairing valves under pressure having plugs, said apparatus comprising:

a tool valve, said tool valve having a passage therethrough sized to accept a valve plug from a valve to be repaired, said tool valve being movable between a first position and a second position, wherein when in said first position, said passage communicates with said pressurized valve and said second position isolating said passage from said pressurized valve;

means for pulling said plug into said passage; and means to retain said plug in said pressurized valve while removing said tool valve, said retaining means comprising means insertable between said tool valve and said zone control valve for engaging said plug and means for engaging said zone control valve.

* * * * *